(12) United States Patent
Petit et al.

(10) Patent No.: US 11,061,797 B2
(45) Date of Patent: Jul. 13, 2021

(54) COMPUTERIZED METHOD AND SYSTEM FOR ANALYSING PERFORMANCE OF AN APPLICATION CARRYING OUT COMMUNICATION FUNCTION CALLS BETWEEN SEVERAL PROCESSES

(71) Applicant: BULL SAS, Les Clayes Sous Bois (FR)

(72) Inventors: Enguerrand Petit, Treffort (FR); Cyril Mazauric, Saint Martin D'Uriage (FR); Benjamin Pajot, Gieres (FR); Xavier Vigouroux, Brie-et-Angonnes (FR)

(73) Assignee: BULL SAS, Les Clayes sous Bois (FR)

( * ) Notice: Subject to any disclaimer, the term of this patent is extended or adjusted under 35 U.S.C. 154(b) by 130 days.

(21) Appl. No.: 16/279,393

(22) Filed: Feb. 19, 2019

(65) Prior Publication Data

US 2019/0258562 A1    Aug. 22, 2019

(30) Foreign Application Priority Data

Feb. 19, 2018  (FR) ........................................ 1851375

(51) Int. Cl.
*G06F 9/44* (2018.01)
*G06F 11/34* (2006.01)
*G06F 9/54* (2006.01)
*G06F 11/36* (2006.01)
*G06F 8/74* (2018.01)

(52) U.S. Cl.
CPC ............ *G06F 11/3466* (2013.01); *G06F 8/74* (2013.01); *G06F 9/547* (2013.01); *G06F 11/3409* (2013.01); *G06F 11/3612* (2013.01); *G06F 11/3636* (2013.01); *G06F 2201/865* (2013.01)

(58) Field of Classification Search
None
See application file for complete search history.

(56) References Cited

U.S. PATENT DOCUMENTS

| | | | | |
|---|---|---|---|---|
| 5,321,838 A | * | 6/1994 | Hensley | G06F 11/3466 714/38.1 |
| 7,165,190 B1 | * | 1/2007 | Srivastava | G06F 11/0709 714/38.14 |
| 7,716,647 B2 | * | 5/2010 | Loh | G06F 11/3476 717/127 |

(Continued)

OTHER PUBLICATIONS

Felix Wolf et al., "Automatic performance analysis of hybrid MPI/OpenMP applications", 2003, Elsevier, pp. 421-439 (Year: 2003).*

(Continued)

*Primary Examiner* — Wei Y Zhen
*Assistant Examiner* — Lanny N Ung
(74) *Attorney, Agent, or Firm* — Kenealy Vaidya LLP

(57) ABSTRACT

Some embodiments are directed to a computerized method and system for analysing performance of an application carrying out communication function calls between several processes, finding an application in particular in the analysis of performance and the schematization of the inter-process communications in a computer application in a parallel and distributed computation environment. The method includes a step of collecting information relating to the function calls, a call or a succession of at least two calls forming a pattern 7 to 11, and a step of compressing the information collected.

7 Claims, 3 Drawing Sheets

(56) References Cited

U.S. PATENT DOCUMENTS

| | | | |
|---|---|---|---|
| 8,578,213 B2* | 11/2013 | Han | G06F 11/3636 714/38.1 |
| 8,584,088 B1* | 11/2013 | Carrick | G06F 8/36 717/124 |
| 2015/0143339 A1 | 5/2015 | Rajanna et al. | |

OTHER PUBLICATIONS

Search Report and Written Opinion from French Patent App. No. 1851375 (dated Oct. 10, 2018).

* cited by examiner

```
for (int j=0;j<N; j++){
for(int i=0; i<SIZE2; i+=len,id+=2){
MPI_Irecv(&(a[i]),len,MPI_DOUBLE,recv[0],0,MPI_COMM_WORLD,&(req1[id]));
MPI_Irecv(&(a[i]),len,MPI_DOUBLE,recv[1],0,MPI_COMM_WORLD,&(req1[id+1]));
}
id=0;
for(int i=0; i<SIZE2;i+=len ,id+=2){
MPI_Isend(&(a[i]),len,MPI_DOUBLE,send[1],0,MPI_COMM_WORLD,&(req2[id+1]));
MPI_Isend(&(a[i]),len,MPI_DOUBLE,send[0],0,MPI_COMM_WORLD,&(req2[id]));
}
MPI_Waitall((2*SIZE2)/len,req1,stat);
MPI_Waitall((2*SIZE2)/len,req2,stat);
}
```

FIG.1

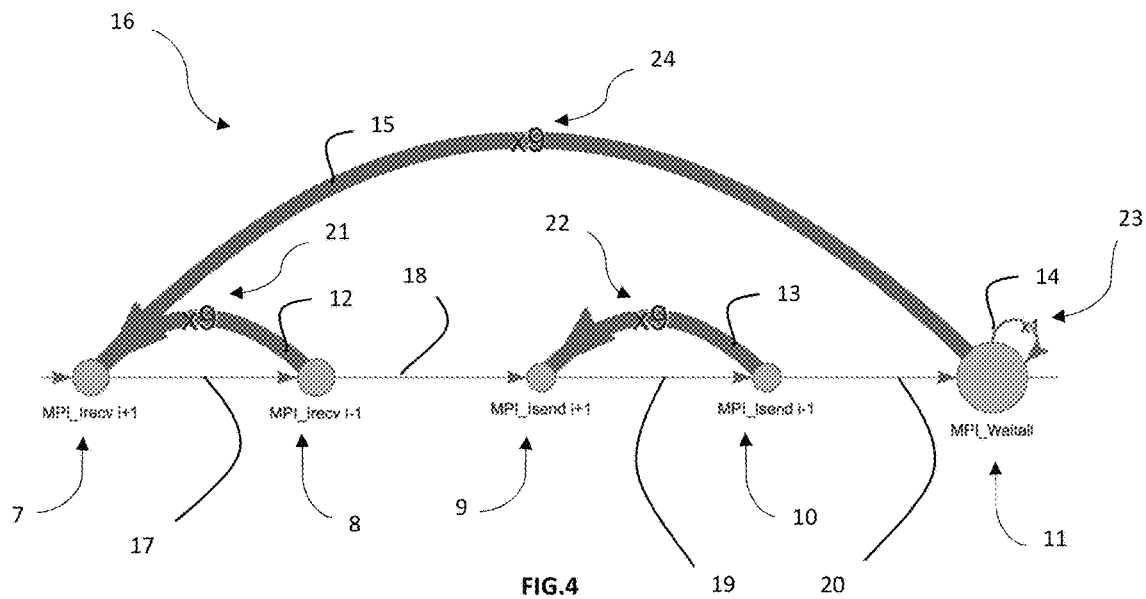

FIG.4

```
var nodes =([

{id:"0xeb56b0" ,label:"MPI_Irecv i+1 ",y:"0", x:"2000",value:0.000001,title:" MPI_Irecv i+1 <BR/>TIME <BR/>MIN : 0.000000s
<BR/> MAX: 0.000001s <BR/> AVG:0.000000s <BR/> TOTAL: 0.000026s <BR/> #CALL:90 <BR/>SIZE <BR/>MIN : 80b <BR/>
MAX: 80b <BR/> AVG:80b <BR/> TOTAL: 7200b <BR/>",fixed:true }, {id:"0xeb5780" ,label:"MPI_Irecv i-1 ",y:"0", x:"2200",value:0.000001,title:" MPI_Irecv i-1 <BR/>TIME <BR/>MIN : 0.000000s
<BR/> MAX: 0.000001s <BR/> AVG:0.000000s <BR/> TOTAL: 0.000024s <BR/> #CALL:90 <BR/>SIZE <BR/>MIN : 80b <BR/>
MAX: 80b <BR/> AVG:80b <BR/> TOTAL: 7200b <BR/>",fixed:true }, {id:"0xeb5dd0" ,label:"MPI_Isend i+1",y:"0", x:"2400",value:0.000001,title:" MPI_Isend i+1 <BR/>TIME <BR/>MIN : 0.000000s
<BR/> MAX: 0.000162s <BR/> AVG:0.000003s <BR/> TOTAL: 0.000247s <BR/> #CALL:90 <BR/>SIZE <BR/>MIN : 80b <BR/>
MAX: 80b <BR/> AVG:80b <BR/> TOTAL: 7200b <BR/>",fixed:true }, {id:"0xeb5ea0" ,label:"MPI_Isend i-1 ",y:"0", x:"2600",value:0.000001,title:" MPI_Isend i-1 <BR/>TIME <BR/>MIN : 0.000000s
<BR/> MAX: 0. 000005s <BR/> AVG:0.000001s <BR/> TOTAL: 0.000093s <BR/> #CALL:90 <BR/>SIZE <BR/>MIN : 80b
<BR/> MAX: 80b <BR/> AVG:80b <BR/> TOTAL: 7200b <BR/>",fixed:true }, {id:"0xeb4950" ,label:"MPI_Waitall ",y:"0", x:"2800",value:0.000002,title:" MPI_Waitall <BR/>TIME <BR/>MIN : 0.000000s <BR/>
MAX: 0.000001s <BR/> AVG:0.000000s <BR/> TOTAL: 0.000001s <BR/> #CALL:2 <BR/>SIZE <BR/>MIN : 0b <BR/> MAX: 0b
<BR/> AVG:0b <BR/> TOTAL: 0b <BR/>",fixed:true },

]);

var edges =([

{from:"0xeb56b0",to:"0xeb5780",value:1 ,arrows:'to'},
{from:"0xeb5780",to:"0xeb5dd0",value:1 ,arrows:'to'},
{from:"0xeb5dd0",to:"0xeb5ea0",value:1 ,arrows:'to'},
{from:"0xeb5ea0",to:"0xeb4950",value:1 ,arrows:'to'}, {from:"0xeb4950",to:"0xeb4950",value:2,arrows:'to',label:'x1',smooth:{type:'curvedCCW'}},
{from:"0xeb5780",to:"0xeb56b0", value :10, arrows:'to', label:'x9', smooth:{type:'curvedCCW'}},
{from:"0xeb5ea0",to:"0xeb5dd0", value:10, arrows:'to', label:'x9', smooth:{type:'curvedCCW'}},
{from:"0xeb4950",to:"0xeb56b0",value:10,arrows:'to',label:'x9',smooth:{type:'curvedCCW'}},

COMPUTERIZED METHOD AND SYSTEM FOR ANALYSING PERFORMANCE OF AN APPLICATION CARRYING OUT COMMUNICATION FUNCTION CALLS BETWEEN SEVERAL PROCESSES

CROSS REFERENCE TO RELATED APPLICATION(S)

This application claims the priority benefit under 35 U.S.C. § 119 of French Patent Application No. 1851375, filed on Feb. 19, 2018, the content of which is hereby incorporated by reference in its entirety.

BACKGROUND

Some embodiments relate to a computerized method and system for analysing performance of an application carrying out communication function calls between several processes. It finds an application in particular in the analysis of performance and the schematization of the inter-process communications in a computerized application in a parallel and distributed computation environment, for example when the communication between processes is implemented according to the "Message Passing Interface" or MPI standard.

The analysis of the performance of an application in a parallel and distributed computation environment is a complex task. One is interested in particular in the inter-process communication through the MPI standard. The MPI standard, implemented in the form of libraries of functions, allows interfacing with the application, by way of specific libraries interposed between this application and the MPI library.

This makes it possible to gather information such as:
the time per process and the overall communication time,
the number of messages as well as the size of the messages sent and received,
the various MPI function calls,
the duration per MPI function call,
the time at which this call occurs.

These various items of information are useful both for obtaining global and local statistics for each process, and for tracing a time series of function calls (commonly called a timeline). This time series is however complicated to generate, to interpret and to use.

SUMMARY

Some embodiments therefore solve in particular the aforesaid problem. Thus, the an aspect of some embodiments is, in particular, to propose a method and a system facilitating the analysis of performance of an application using inter-process communication in a parallel and distributed computation environment.

Some embodiments are thus, according to a first aspect, a computerized method of analysing performance of an application, the application carrying out calls of functions of communication between several processes, a call or a succession of at least two calls forming a pattern.

The method includes a step of collecting information relating to the function calls, and a step of compressing the information collected.

The compression step includes a step of detecting, on the basis of the information collected, patterns and successions of patterns, so as to form a grammar in which each pattern and each succession of patterns are identified by a unique identifier.

The compression step also includes a step of detecting, in the grammar, the repetition of patterns and of successions of patterns.

This compression step further includes a step of generating a compressed trace file in which are stored the patterns and the successions of patterns, as well as their respective numbers of repetitions.

According to certain modes of implementation, the method furthermore includes one or more of the following characteristics, taken in isolation or according to all or most technically possible combinations:

the method includes generating of a graph on the basis of the compressed trace file, whose nodes represent the patterns ordered according to the chronology of the calls of the functions forming the patterns;

the graph includes a first category of edges, each edge of the first category of edges joining two nodes corresponding to two successive patterns according to the chronological order of the calls of the functions forming each of the two successive patterns;

the graph includes a second category of edges, each edge of the second category of edges joining two nodes corresponding respectively to the start and to the end of a succession of patterns which repeats in the trace file, or forming a loop over a node which repeats in the trace file, each edge of the second category of edges being assigned a weight corresponding to the number of repetitions of the corresponding succession of patterns or of the corresponding pattern;

the step of detecting patterns and successions of patterns includes determining from the collected information, for each call of a communication function, a called function, a receiving process, a sending process, and a time of the call;

the determination is carried out in the course of the execution of the application;

the grammar is stored in a memory, and the step of detecting the repetition of the patterns and successions of patterns is carried out by traversing the grammar once the execution of the application is terminated;

the step of collecting information includes generating a trace file in which are stored, for each call of a communication function and in a manner ordered according to the time of the call, the called function, the receiving process, the sending process, and the determination of the called function, the receiving process, the sending process, and/or the time of a call is carried out in the trace file, once the execution of the application is terminated;

each pattern is identified by the name of the first function called in this pattern, and each succession of patterns is identified by the name of the first function called in the first pattern of this succession of patterns;

the function calls are carried out, for example, according to a protocol of "Message Passing Interface" or MPI type, or of "Open Multi-Processing" or OpenMP type.

Some other embodiments also concern, according to a second aspect, a computerized system for analysing performance of an application carrying out calls of functions of communication between several processes, the system including a processor and a memory, the memory including program instructions which, when they are executed by the processor, cause the system implement the method as presented above.

Thus, the method and the system of some embodiments make it possible to easily generate the timeline, and to simplify this timeline, by detecting the inter-process communication function call loops, that is to say a succession of hierarchical calls which repeats.

To do this, the function calls are analysed, as and when the application is executed, e.g., on the fly, or by using a trace file which records the calls.

These calls form complex patterns which are detected and recorded, without loss of information. This detection of patterns is carried out on each process, but also between processes, thereby making it possible to obtain a yet more straightforward and clear graphical representation of all or most the communication schemes in a single graph.

BRIEF DESCRIPTION OF THE DRAWINGS

The characteristics and advantages of some embodiments will become apparent on reading the nonlimiting description which follows, given merely by way of example, with reference to the following appended figures:

FIG. 1: algorithmic representation of an exemplary application carrying out inter-process communication function calls, according to the MPI standard;

FIG. 3: representation of an exemplary compressed trace file corresponding to the execution of the application of FIG. 1, generated according to the method of some embodiments;

FIG. 4: schematic representation of a graph generated according to the method of some embodiments, on the basis of the application of FIG. 1.

DETAILED DESCRIPTION OF EXEMPLARY EMBODIMENTS

Figure 2:
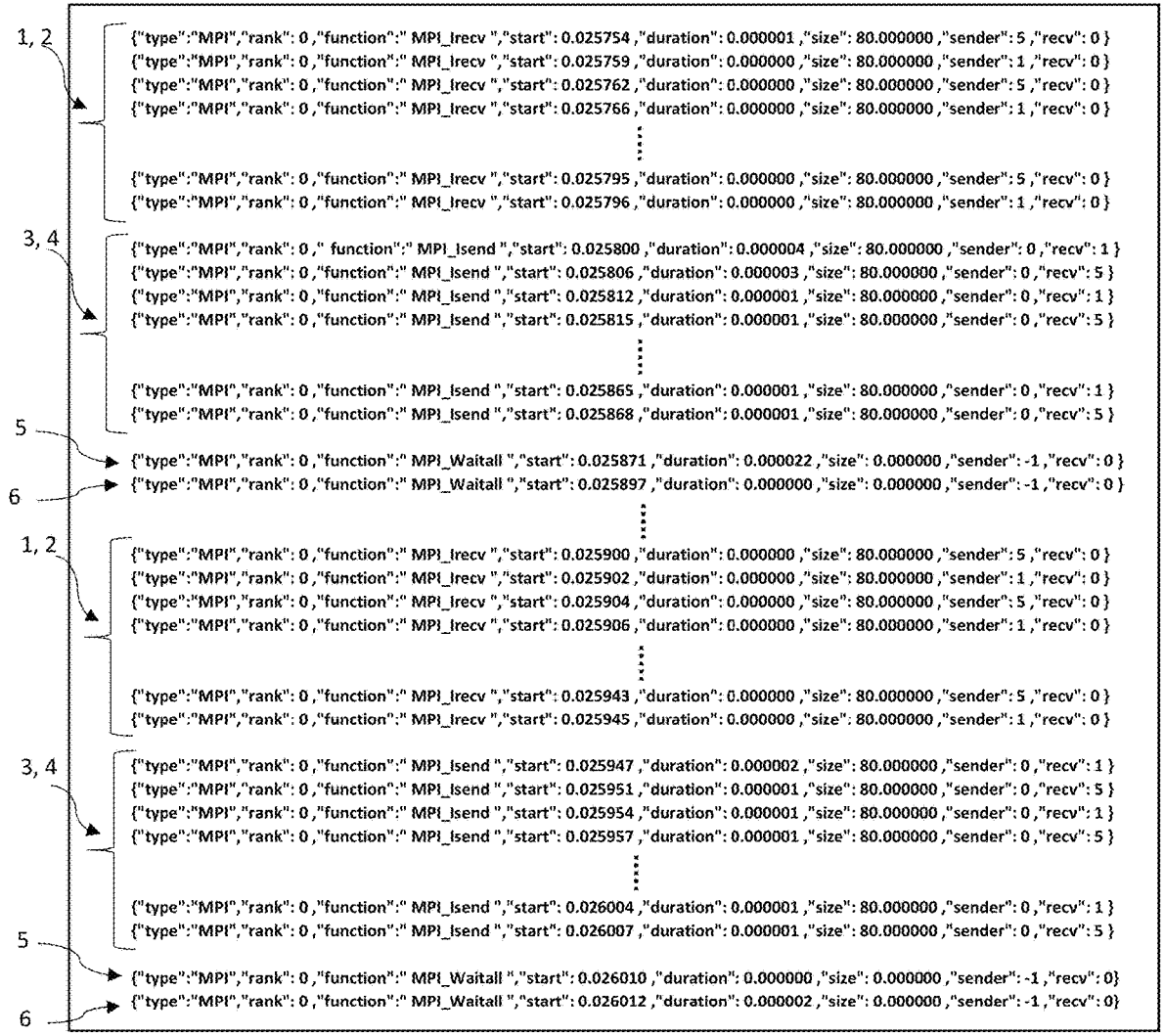
FIG. 2: representation of an exemplary raw trace file generated in the course of the execution of the application of FIG. 1.

In the subsequent description, an exemplary implementation of the method of some embodiments is presented in the context of the use of the MPI standard.

In a parallel and distributed program, or application, the communications are generally carried out between a process and its near neighbours (distance equal to 1), at each time step.

An exemplary application, represented in the form of an algorithm, is represented in FIG. 1. In this example, a certain number of operations corresponding to MPI function calls are repeated N times. More precisely, this involves operations of sending to, and of receiving from, processes of distance equal to 1 (rank of the sending process, respectively receiving process, plus or minus 1).

In this example, six communication function calls 1 to 6 are performed and repeated, namely:
- a call 1 to the reception function MPI_Irecv for reception by the process of current rank of an item of information from a process of current rank plus one (distance equal to one),
- a call 2 to the reception function MPI_Irecv for reception by the process of current rank of an item of information from a process of current rank minus one (distance equal to one),
- a call 3 to the send function MPI_Isend for sending by the process of current rank of an item of information to a process of current rank plus one (distance equal to one),
- a call 4 to the send function MPI_Isend for sending by the process of current rank of an item of information to a process of current rank minus one (distance equal to one),
- two calls 5 and 6 to the function MPI_Waitall for temporization, until all or most the communications in progress have terminated.

In this example, the syntax used for the communication function calls is that of the C language MPI function library.

Thus, according to the method of some embodiments, the analysis of performance of the application represented algorithmically in FIG. 1 can include or can consist of firstly in detecting patterns, i.e., calls from among the calls 1 to 6, or a succession of at least two calls from among the calls 1 to 6, and their possible repetitions.

The method thus includes a step of detecting the repetition of the patterns and successions of patterns, these patterns being represented in an example with references 7 to 11 in FIGS. 3 and 4 which will be described later in more detail.

Each pattern 7 to 11 detected is identified by a unique identifier, which may for example contain the name of the first function called in the pattern 7 to 11, and each detected succession of patterns is identified by a unique identifier, which may for example contain the name of the first function called in the first pattern of the succession of patterns.

This step of detecting the patterns 7 to 11 makes it possible to form a grammar, on the basis of which, by traversing it, the repetitions of patterns are detected in turn.

On the basis of the analysis of the calls 1 to 6, a compressed trace file is generated, such as represented in FIG. 3, in which are stored the patterns 7 to 11 and the successions of patterns 7 to 11, as well as their respective numbers of repetitions referenced 12 to 15.

More precisely, for the detection of the repetition of patterns 7 to 11 and of the repetition of successions of patterns 7 to 11, for each call 1 to 6 of a communication function, the function called, the receiving process, the sending process, and the time of the call are determined.

These calls 1 to 6 may be analysed directly in the course of the execution of the application, e.g., on the fly, that is to say by processing the calls as soon as they are completed.

Alternatively, it is possible to use a trace file which records these calls 1 to 6, such as represented in FIG. 2. Specifically, for each call 1 to 6, there are stored, in particular, in a manner ordered according to the time of the call, the called function, the receiving process, the sending process. The analysis of each call 1 to 6 can then be carried out later in this trace file.

For the detection of the patterns 7 to 11 and their repetitions, it is possible to use an algorithm of the type for data compression without loss of information and without loss of sequentiality, such as a modified Sequitur type algorithm.

Sequitur is an algorithm which allows hierarchical compression of text, by inferring a hierarchical structure from a sequence of discrete symbols, by replacing repeated phrases detected by a grammatical rule which generates the phrase, and by continuing recursively (see: Nevill-Manning, C. G. and Witten, I. H. (1997) "Identifying Hierarchical Structure in Sequences: A linear-time algorithm," Journal of Artificial Intelligence Research, 7, 67-82).

The result of the execution of such an algorithm can be given in the form of a hierarchical representation of the original sequence, which offers information about its lexical structure.

However, while Sequitur is based on simple symbols such as letters or digits, the method of some embodiments is more complex, since a terminal element of the hierarchical structure, corresponding to a pattern 7 to 11, is composed both of words, integers and real numbers.

For the needs of the method of some embodiments one is limited however to a subset of information, namely: the function (its name), the rank of the calling party, the receiver, the sender, the time (defined for example by the line number in the trace file).

One thus refocuses on the sequence of instructions (or of calls), while preserving the notions of sender, receiver, calling party, as well as the notion of temporality through the very structure of the trace file since the calls are ordered chronologically.

The character strings corresponding to the function calls, in the trace file or obtained in the course of the execution of the application, are therefore analysed to form the compressed trace file represented in FIG. 3, including the terminal symbols 7 to 11 corresponding to the patterns 7 to 11, and the loops 12 to 15 representing the repetitions 12 to 15 of one or more terminal symbols or patterns 7 to 11.

The compressed trace file also includes the definition of the chronological links 17 to 20 between the various patterns 7 to 11.

This compressed trace makes it possible to generate a graph for visualizing the stringing together of the patterns 7 to 11 and the various repetitions 12 to 15.

Thus, on the basis of the compressed trace corresponding to the execution of the application represented in FIG. 1, the graph 16 of FIG. 4 is generated.

This graph 16 contains nodes 7 to 11 representing the patterns 7 to 11 ordered according to the chronology of the calls 1 to 6 of the functions forming these patterns 7 to 11.

Moreover, the graph 16 includes two categories of edges 12 to 20 joining certain of the nodes 7 to 11 together.

In the first category of edges, each edge 17 to 20 joins two nodes 7 to 11 corresponding to two successive patterns 7 to 11 according to the chronological order of the calls 1 to 6 of the functions forming each of the two successive patterns 7 to 11.

Thus:
edge 17 joins nodes 7 and 8, in the direction of node 8,
edge 18 joins nodes 8 and 9, in the direction of node 9,
edge 19 joins nodes 9 and 10, in the direction of node 10,
edge 20 joins nodes 10 and 11, in the direction of node 11.

In the second category of edges, each edge 12 to 15, either joins two nodes 7 to 11 corresponding respectively to the start and the end of a succession of patterns 7 to 11 which repeats during the execution of the application and/or in the trace file, or forms a loop 14 over a node 11 which repeats during the execution of the application and/or in the trace file.

Each edge 12 to 15 of this second category of edges is assigned a weight 21 to 24 corresponding to the number of repetitions 21 to 24 of the corresponding succession of patterns 7 to 11, or of the corresponding pattern 11.

In the example of the graph 16 represented in FIG. 2, the application parameter N represented in FIG. 1 is equal to 9.
Thus:
edge 12 joins nodes 7 and 8, in the direction of node 7, and is assigned the weight 21 equal to 9, so as to manifest the 9 repetitions of the successive calls of the functions in the patterns 7 and 8,
edge 13 joins nodes 9 and 10, in the direction of node 9, and is assigned the weight 22 equal to 9, so as to manifest the 9 repetitions of the successive calls of the functions in the patterns 9 and 10,
edge 14 joins node 11 with itself, and is assigned the weight 23 equal to 9, so as to manifest the 9 repetitions of the successive calls of the functions in the pattern 11,
edge 15 joins nodes 7 and 11, in the direction of node 7, and is assigned the weight 24 equal to 9, so as to manifest the 9 repetitions of the successive calls of the functions in the patterns 7 to 11.

To generate the compressed trace file from the trace file, and be able subsequently to generate the graph 16, the hierarchical structure corresponding to the grammar obtained is traversed depthwise, and the various non-terminal symbols are compared so as to group them together if they are equivalent, while counting the number of times that they repeat at the various depths of the grammar. The depth of the grammar corresponds to the number of non-terminal symbols before a terminal symbol in the hierarchical structure is obtained.

Various graphs are thus obtained for the various processes. These graphs are then compared to form groups of processes. A group is composed of all or most the processes having an identical graph. At the end of this process, a single graph is preserved per group, thereby enabling the model to be made still more straightforward and to display just one graph per group of processes.

As presented above, a graph 16 is composed of nodes 7 to 11 and of directional edges 12 to 20 which represent the passage from one call to another or from one succession of calls to another. The edges 12 to 15 corresponding to the loops 12 to 15 are assigned weights 21 to 24 representing the number of respective passages through these edges.

Once the graph 16 has been obtained, all or most the data excluded during the compression is recovered so as to reconsider all or most the notions of times, durations and of sizes of the messages transmitted. By recovering these data, it is possible to compute for each loop, and/or for each call, the statistics regarding times and/or sizes of messages transmitted. It is also possible to detect desynchronizations of processes within one and the same group.

On the basis of these data, it is possible to assign a weight to each node, proportional to the time spent in the corresponding function call or succession of calls. A node may also be associated with all or most the statistics relating to the corresponding call or succession of calls for the various processes of a group.

An analysis of the application's performance is thus possible from the graph and/or the associated statistical data assigned with the nodes and/or weights assigned to the nodes and/or weights assigned to the edges.

For the implementation of the method, a computerized system is used, which includes a processor and a memory. In the memory are stored program instructions which, when they are executed by the processor, implement the method of some embodiments.

The present description is given by way of example and does not limit some embodiments.

In particular, some embodiments are not limited to applications using inter-process communication functions of MPI type. It extends to other libraries of functions, such as the functions of "Open Multi-Processing" or OpenMP type for example. It also extends to the analysis of the calls of input/output (read-write) functions. More generally it extends to the analysis of applications carrying out calls of functions from which the information may be extracted chronologically, from a trace file or obtained in the course of the execution of the application in question.

The invention claimed is:
1. A computerized method of analyzing performance of an application, the application carrying out calls of functions of communication between several processes, a call or a succession of at least two calls forming a pattern, the method comprising:

collecting information relating to the function calls, and compressing the information collected, the compressing including:

detecting, on a basis of the information collected, patterns and successions of patterns, so as to form a grammar in which each pattern and each succession of patterns are identified by a unique identifier, detecting, in the grammar, a repetition of patterns and of successions of patterns, generating a compressed trace file in which are stored the patterns and the successions of patterns, as well as their respective numbers of repetitions, generating a graph on a basis of the compressed trace file, wherein each node of the graph represents a pattern, wherein the graph includes a first category of edges, each edge of the first category of edges joining two nodes corresponding to two successive patterns according to a chronological order of the calls of the functions forming each of the two successive patterns:

wherein the graph includes a second category of edges, each edge of the second category of edges joining two nodes corresponding respectively to a start and to an end of a succession of patterns which repeats in the compressed trace file, or forming a loop over a node which repeats in the compressed trace file, each edge of the second category of edges being assigned a first weight corresponding to the number of repetitions of the corresponding succession of patterns or of the corresponding pattern;

assigning to each node of the graph a second weight proportional to a time spent in the function call or the succession of calls corresponding to each node;

performing an analysis of application performance based on the graph and the first and second weights assigned to the nodes and edges of the graph.

2. The method according to claim 1, wherein detecting patterns and successions of patterns includes determining in the information collected, for each call of a communication function, a called function, a receiving process, a sending process, and a time of the call.

3. The method according to claim 2, wherein the determining is carried out as the application is executed.

4. The method according to claim 3, wherein the grammar is stored in a memory, and in that the step of detecting the repetition of the patterns and successions of patterns is carried out by traversing the grammar once the execution of the application is terminated.

5. The method according to claim 2, wherein collecting information includes generating a trace file in which are stored, for each call of a communication function and in a manner ordered according to the time of the call, the called function, the receiving process, the sending process, and wherein the determination of the called function, the receiving process, the sending process and the time of the call for each call is carried out in the trace file, once the execution of the application is terminated.

6. The method according to any claim 1, wherein each pattern is identified by a name of a first function called in each pattern, and each succession of patterns is identified by a name of a first function called in a first pattern of each succession of patterns.

7. A computerized system for analyzing performance of an application carrying out calls of functions of communication between several processes, the system including a processor and a memory, the memory including program instructions which, when they are executed by the processor, cause the system to perform the steps of the method, the method including:

collecting information relating to the function calls, and compressing the information collected, the compressing including:

detecting, on a basis of the information collected, patterns and successions of patterns, so as to form a grammar in which each pattern and each succession of patterns are identified by a unique identifier, detecting, in the grammar, a repetition of patterns and of successions of patterns, generating a compressed trace file in which are stored the patterns and the successions of patterns, as well as their respective numbers of repetitions, generating a graph on a basis of the compressed trace file, wherein each node of the graph represents a pattern, wherein the graph includes a first category of edges, each edge of the first category of edges joining two nodes corresponding to two successive patterns according to a chronological order of the calls of the functions forming each of the two successive patterns;

wherein the graph includes a second category of edges, each edge of the second category of edges joining two nodes corresponding respectively to a start and to an end of a succession of patterns which repeats in the trace file, or forming a loop over a node which repeats in the trace file, each edge of the second category of edges being assigned a first weight corresponding to the number of repetitions of the corresponding succession of patterns or of the corresponding pattern;

assigning to each node of the graph a second weight proportional to a time spent in the function call or the succession of calls corresponding to each node;

performing an analysis of application performance based on the graph and the first and second weights assigned to the nodes and edges of the graph.

* * * * *